United States Patent [19]

Grune et al.

[11] Patent Number: 5,795,583
[45] Date of Patent: Aug. 18, 1998

US005795583A

[54] HOMOGENIZATION OF DISPERSIONS

[75] Inventors: Burkhard Grune; Ludwig Hager, both of Burghausen; Helmut Huber, Emmerting; Gerhard Lwowski, Burghausen, all of Germany; Wilhelm Zadny, Ach, Austria; Horst Müller, Emmerting; Otto Schneider, Burghausen, both of Germany

[73] Assignee: Wacker-Chemie GmbH, Munich, Germany

[21] Appl. No.: 867,108

[22] Filed: Jun. 2, 1997

[30] Foreign Application Priority Data

Jun. 14, 1996 [DE] Germany ............... 196 23 850.1

[51] Int. Cl.$^6$ ................................................ A61K 9/00
[52] U.S. Cl. ....................... 424/400; 424/401; 241/30
[58] Field of Search ................. 523/218; 524/495, 524/496, 59, 430, 492, 493, 588; 424/400, 401; 241/30

[56] References Cited

U.S. PATENT DOCUMENTS 5,222,807  6/1993  Gaddis .

FOREIGN PATENT DOCUMENTS

| 0726086 | 8/1956 | European Pat. Off. . |
| 0 060 313 | 7/1984 | European Pat. Off. . |
| 0784683 | 7/1985 | European Pat. Off. . |
| 0060373 | 7/1987 | European Pat. Off. . |
| 878785 | 2/1960 | United Kingdom . |

OTHER PUBLICATIONS

Derwent Abstract Corresponding to EP 0 726 086 (#S6–364225).

Derwent Abstract Corresponding to EP 0 184 683 (#86–156675).

*Primary Examiner*—Thurman K. Page
*Assistant Examiner*—Brian K. Seidleck
*Attorney, Agent, or Firm*—Brooks & Kushman

[57] ABSTRACT

The invention relates to a method for preparing homogeneous dispersions of fluidizable bulk materials, wherein, in a first step, fluidizable bulk materials are blended with liquid to produce a raw dispersion and, in a second step, the raw dispersion is conveyed through a continuous enclosed dispersing apparatus by means of a forced-conveyance apparatus.

14 Claims, No Drawings

HOMOGENIZATION OF DISPERSIONS

BACKGROUND OF THE INVENTION

The invention relates to a method for preparing homogeneous dispersions of fluidizable bulk materials, wherein, a raw dispersion is conveyed through a continuous enclosed dispersing apparatus by means of a forced-conveyance apparatus.

Fluidizable bulk materials are finely particulate and can be fluidized with air to produce free-flowing mixtures. Such bulk materials tend to agglomerate in dispersions. Homogeneous dispersions comprising liquid and fluidizable bulk materials are therefore difficult to prepare.

Such dispersions are prepared, for example, by fluidized highly disperse silicic acid being blended with silicone oil. This raw dispersion is fed across a roller mill where it is intensively sheared by narrow gaps between the rollers and as a result is homogenized.

Roller mills have the drawback, however, that owing to their open construction and large roller surface area, contaminants such as dust can readily infiltrate the dispersion and highly volatile components of the dispersion can evaporate. During rolling, static charges can build up in the dispersion. It is therefore a common requirement for roller mills to be set up in separate explosion-proof, dust free and well-ventilated rooms.

BRIEF SUMMARY OF THE INVENTION

It is an object of the present invention to provide a method and description of an apparatus for the continuous preparation of homogeneous dispersions of fluidizable bulk materials, which do not entail the above mentioned drawbacks of the roller mills.

DETAILED DESCRIPTION OF THE INVENTION

The invention relates to a method for preparing homogeneous dispersions of fluidizable bulk materials, wherein, in a first step, fluidizable bulk materials are blended with liquid to produce a raw dispersion and, in a second step, the raw dispersion is conveyed through a continuous enclosed dispersing apparatus by means of a forced-conveyance apparatus.

The present method affords homogeneous dispersions. Agglomerates are broken up as readily as with roller mills. Moreover, owing to the enclosed construction of the dispersing apparatus the dispersion is not infiltrated by contaminants, highly volatile components of the dispersion do not evaporate into the ambient atmosphere, and static charges do not build up in the dispersion.

The use of an enclosed construction also makes it possible to operate under elevated or reduced pressure, which may be set, for example, by the forced-conveyance apparatus, a pressure vessel or compressed air.

If the entire method is carried out in an enclosed apparatus, it can be operated via automatic process control.

Liquids used in the present invention generally have a viscosity of from 0.1 to $10^6$ mPa.s. Preferably the liquids have a viscosity of from 0.5 mPa.s to $10^5$ mPa.s. Any type of liquid can be used. Preferably, the liquids are silicone oils which have a viscosity of at least 10 mPa.s.

Materials regarded as fluidizable bulk materials include, for example, flyash, carbon black, coal dust and highly disperse metal oxides. Preferably, the fluidizable bulk materials are thickening fillers, i.e. fillers having a BET surface area of at least 50 $m^2/g$, such as fumed silicic acid, precipitated silicic acid, carbon black such as furnace black and acetylene black, and silicon-aluminum mixed oxides having large BET surface areas; fibrous fillers such as asbestos, and synthetic fibres. Said fillers may have been hydrophobicized, for example by having been treated with organosilanes or -siloxanes or by etherification of hydroxyl groups to produce alkoxy groups. One type of filler or alternatively a mixture of two or more fillers may be used as a bulk material.

The present method is suitable for preparing any dispersion required, for example coatings, paints, cosmetic and medical creams and ointments, pastes and liquid-silicone rubbers.

The method is particularly suitable for preparing dispersions of silicic acid having a BET surface area of at least 50 $m^2/g$ in silicone oil, since the silicic acid has a pronounced tendency to agglomerate therein. The viscosity in these dispersions can be reduced by increasing shear energy.

In the first step, the raw dispersion can be prepared in any mixer. Suitable mixers include, for example, agitators, in-line mixers or dispersers.

The forced-conveyance apparatus may take the form of a pump being disposed upstream or downstream of the dispersing apparatus. The pump used can be any pump which delivers liquids. Examples of suitable pumps are centrifugal pumps, hose pumps, piston pumps or diaphragm pumps.

The forced-conveyance apparatus can be used to influence the throughput of dispersion through the dispersing apparatus. The throughput in turn influences the shear energy which acts on the dispersion, viscosity and temperature of the dispersion being controlled as a result.

The dispersing apparatus used is preferably an enclosed rotating rim gear disperser, a slotted rotorstator or a colloid mill. The dispersing apparatus is preferably arranged vertically, to prevent gas bubbles from breaking through. Within the dispersing apparatus, dispersing tools producing different degrees of shear can be substituted for one another. Preferably, the milling gap in the dispersing apparatus is adjustable.

The dispersing apparatus may also act so as to convey material. This is advantageous when dispersions from 1000, in particular 5000 mPa.s are being processed.

The dispersing apparatus requires a smaller power input than a roller mill. For example, an in-line disperser with a power input of 20 kW processes from 1000 to 1100 kg/h of a silicone oil/silicic acid dispersion having a viscosity of 30000 mPa.s. A 3-roll mill requires a power input of 18 kW for processing as little as 400 kg/h of the same dispersion.

Owing to the low energy input, the dispersion heats up to a lesser extent in the dispersing apparatus than on the roller mill. Usually it is possible to dispense with additional cooling if a dispersing apparatus is used.

Preferably, a strainer is fitted downstream of the dispersing apparatus.

The preparation of many dispersions, for example dispersions of silicic acid having a BET surface area of at least 50 $m^2/g$ in silicone oil, may involve a reactor which is disposed between the blending apparatus and the dispersing apparatus. In the reactor, the raw dispersion can be treated at a desired temperature. Optionally, additives may be added to the raw dispersion in the reactor.

The homogeneous dispersion prepared according to the present invention can be stored, subjected to further treatment or used immediately in the preparation of coatings, paints, cosmetics, and the like.

What is claimed is:

1. A method for preparing homogeneous dispersions of fluidizable bulk materials, comprising:
   in a first step, blending fluidizable bulk materials in a mixer with a liquid to produce a raw dispersion and,
   in a second step, conveying the raw dispersion through a continuous enclosed, dispersing apparatus different from said mixer, said conveying being accomplished by means of a forced-conveyance apparatus.

2. The method as claimed in claim 1 wherein the liquid have a viscosity of from 0.1 mPa.s to $10^6$ mPa.s.

3. The method as claimed in claim 1, wherein the fluidizable bulk materials are flyash, carbon black, coal dust or disperse metal oxides.

4. The method as claimed in claim 1, wherein the fluidizable bulk materials are thickening fillers having a BET surface area of at least 50 $m^2/g$.

5. The method as claimed in claim 1, wherein the fluidizable bulk material is fumed or precipitated silicic acid.

6. The method as claimed in claim 1, wherein the liquid is a silicone oil.

7. The method as claimed in claim 1, wherein the liquid has a viscosity of from 0.5 mPa.s to $10^6$ mpa.s.

8. A method f or preparing a homogeneous dispersion of a thickening filler, comprising:
   in a first step, blending a silicic acid having a BET surface area of at least 50 $m^2/g$ in a mixer with a silicone oil to produce a raw dispersion and,
   in a second step, conveying the raw dispersion through a continuous, enclosed dispersing apparatus different from said mixer, said conveying being accomplished by means of a forced-conveyance apparatus.

9. The method of claim 1, wherein the dispersing apparatus is an enclosed rotating rim gear disperser.

10. The method of claim 1, wherein the dispersing apparatus is a slotted rotorstator.

11. The method of claim 1, wherein the dispersing apparatus is a colloid mill.

12. The method of claim 8, wherein the dispersing apparatus is an enclosed rotating rim gear disperser.

13. The method of claim 8, wherein the dispersing apparatus is a slotted rotorstator.

14. The method of claim 8, wherein the dispersing apparatus is a colloid mill.

* * * * *